US008223716B2

(12) United States Patent
Ohba et al.

(10) Patent No.: US 8,223,716 B2
(45) Date of Patent: Jul. 17, 2012

(54) ASSISTED PROACTIVE IP ADDRESS ACQUISITION

(75) Inventors: Yoshihiro Ohba, Englewood Cliffs, NJ (US); Rafael Marin Lopez, Morcia (ES)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 925 days.

(21) Appl. No.: 11/567,134

(22) Filed: Dec. 5, 2006

(65) Prior Publication Data

US 2008/0130647 A1 Jun. 5, 2008

(51) Int. Cl.
*H04W 4/00* (2009.01)

(52) U.S. Cl. ........ 370/331; 370/310; 370/328; 370/329; 370/335; 370/336; 370/337; 370/400; 455/422.1; 455/436; 455/437; 455/438

(58) Field of Classification Search .................. None
See application file for complete search history.

(56) References Cited

U.S. PATENT DOCUMENTS

| 6,138,120 | A | * | 10/2000 | Gongwer et al. ................. 1/1 |
| 2006/0140150 | A1 | * | 6/2006 | Olvera-Hernandez et al. ............... 370/331 |

FOREIGN PATENT DOCUMENTS

| JP | 2004-200822 A | 7/2004 |
| JP | 2008-503108 A | 1/2008 |
| WO | 2006-083039 A1 | 8/2006 |
| WO | WO 2006/083039 A1 | 8/2006 |

OTHER PUBLICATIONS

Kaufman, "Internet Key Exchange (IKEv2) Protocol", Dec. 2005.*
Kumar et al., "DHCPv4 for PANA authentication agents", draft-ietf-dhc-paa-option-00.txt, Oct. 6, 2005.*
Forsberg et al., "PANA", draft-ietf-pana-pana-10.txt, Internet Task Force, Jul. 15, 2005.*
Jayaraman et al., "PANA framework", draft-ietf-pana-framework-01.txt, Jul. 16, 2004.*
Tschofenig et al., "EAP IKEv2 method", draft-tschofenig-eap-ikev2-07.txt, Internet Task Force, Jul. 2005.*
International Search Report dated Sep. 9, 2008.
Dutta, et al., "A Framework of Media Independent Pre-Authentication (MPA); draft-ohba-mobopts-mpa-framework-03.txt," IETF Standard Working Draft, Oct. 22, 2006.
Fajardo, et al. "Media-Independent Pre-Authentication (MPA) Implementation Results," draft-ohba-mobopts-mpa-implementation-03.txt, IETF Standard Working Draft, Oct. 22, 2006.
Japanese Office Action dated Sep. 20, 2011, issued in corresponding Japanese Patent Application No. 2009-524033.
Jan. 25, 2012 Office Action in Corresponding Canadian patent application (citing WO 2006/083039, already of record).
Chinese Office Action dated Jun. 7, 2011, issued in corresponding Chinese Patent Application No. 2007800045782.

* cited by examiner

*Primary Examiner* — Anh-Vu H Ly
*Assistant Examiner* — Aixa A Guadalupe
(74) *Attorney, Agent, or Firm* — Westerman, Hattori, Daniels & Adrian, LLP

(57) ABSTRACT

The present invention relates to reducing the time required to provide an IP address to a mobile node by pro-actively obtaining IP addresses, through the use of PANA-assisted pro-active IP address acquisition, IKEv2-assisted proactive IP address acquisition, or by pro-active IP address acquisition using DHCP only.

20 Claims, 2 Drawing Sheets

ASSISTED PROACTIVE IP ADDRESS ACQUISITION

BACKGROUND

Field of the Invention

The present application relates to wireless networking and, in some preferred embodiments, to methods of improving handoff of a mobile device between neighboring networks and/or the like through the pre-acquisition of IP addresses.

CROSS-REFERENCE TO RELATED PATENT APPLICATIONS

The present application incorporates by reference U.S. patent application Ser. No. 11/307,362, filed on Feb. 2, 2006, including the applications to which application Ser. No. 11/307,362 claims priority, and the references cited therein.
General Background Discussion:
1. Networks and Internet Protocol There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

IP (Internet Protocol) is a protocol by which data can be sent from one device (e.g., a phone, a PDA [Personal Digital Assistant], a computer, etc.) to another device on a network. IP is a connectionless protocol. Today there are varieties of versions of IP, including, e.g., IPv4, IPv6, etc. Each host device on the network has at least one IP address that identifies the host devices point of attachment to the IP networks. The connection between end points during a communication is not continuous. When a user sends or receives data or messages, the data or messages are divided into components known as packets. Every packet is treated as an independent unit of data.

In order to standardize the transmission between points over the Internet or the like networks, an OS (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router, or a workstation. Messages destined for some other host are not passed up to the upper layers but are forwarded to the other host. In the OSI and other similar models, IP is in Layer-3, the network layer. The layers of the OS model are listed below. Layer 7 (i.e., the application layer) is a layer at which, for example, communication partners are identified, quality of service is identified, user authentication and privacy are considered, constraints on data syntax are identified and the like. Layer 6 (i.e., the presentation layer) is a layer that, for example, converts incoming and outgoing data from one presentation format to another, and the like. Layer 5 (i.e., the session layer) is a layer that, for example, sets up, coordinates, and terminates conversations, exchanges and dialogs between the applications. Layer-4 (i.e., the transport layer) is a layer that, for example, manages end-to-end control and error-checking, and the like. Layer-3 (i.e., the network layer) is a layer that, for example, handles routing and forwarding, and the like. Layer-2 (i.e., the data-link layer) is a layer that, for example, provides synchronization for the physical level, does bit-stuffing and furnishes transmission protocol knowledge and management, and the like. The Institute of Electrical and Electronics Engineers (IEEE) sub-divides the data-link layer into two further sub-layers, the MAC (Media Access Control) layer that controls the data transfer to and from the physical layer and the LLC (Logical Link Control) layer that interfaces with the network layer, interprets commands, and performs error recovery. Layer 1 (i.e., the physical layer) is a layer that, for example, conveys the bit stream through the network at the physical level. The IEEE sub-divides the physical layer into the PLCP (Physical Layer Convergence Procedure) sub-layer and the PMD (Physical Medium Dependent) sub-layer.

Typically, layers higher than layer-2 (such as, for example, layers including the network layer or layer-3 in the OSI model and the like) is referred to as the higher-layers.
2. Wireless Networks Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, for example, a single chip transceiver with an integrated transmitter, receiver and, if desired, other functions); an antenna; a processor; one or more audio transducers (for example, a speaker or a microphone as in devices for audio communications); electromagnetic data storage (such as, for example, ROM, RAM, digital data storage, and the like, such as in devices where data processing is provided); memory; flash memory; a full chip set or integrated circuit; interfaces (such as for example, USB, CODEC, UART, PCM, etc.); and/or the like.

Wireless LANs (WLANs) in which a mobile user can connect to a local area network (LAN) through a wire less connection may be employed for wireless communications. Wireless communications can include, for example, communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BOA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, for example, a BDN, a BDA, an IP address, and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two or more independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or COMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their initially assigned IP Address. Mobile IP enhances Internet Protocol (IP) and adds a means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, as for example, the Internet Control Message Protocol (ICMP).

In basic IP routing (i.e. outside mobile IP), typically, routing mechanisms rely on the assumptions that each network node always has a constant attachment point to, for example, the Internet and that each node's IP address identifies the network link to which it is attached. As used herein, the terminology "node" includes a connection point, which can include, for example, a redistribution point or an end point for data transmissions, and which can recognize, process and/or forward communications to other nodes. For example, Internet routers can look at, such as an IP address prefix, or the like, identifying a device's network. Then, at a network level, routers can look at, for example, a set of bits identifying a particular subnet. Then, at a subnet level, routers can look at, e.g., a set of bits identifying a particular device. With typical mobile IP communications, if a user disconnects a mobile device from, for example, the Internet and tries to reconnect it at a new subnet, then the device has to be reconfigured with a new IP address, a proper netmask, and a default router. Otherwise, routing protocols would not be able to deliver the packets properly.

The preferred embodiments improve upon technologies described, e.g., in the following references, each of which references listed below is incorporated herein by reference in its entirety:

1. Perkins, C., "IP Mobility Support for IPv4". RFC 3344, August 2002. Referred to herein as [RFC3344].
2. Johnson, D., Perkins, C. and J. Arkko, "Mobility Support in IPv6", RFC 3775. June 2004. Referred to herein as [RFC3775].
3. Malki, K., "Low latency Handoffs in Mobile IPv4", draf-ietf-mobileip-lowlatency-handoffs-v4-09 (work in progress), June 2004. Referred to herein as [I-D.ietf-mobileip-lowlatency-handoffs-v4].
4. Koodli. R. "Fast Handovers for Mobile IPv6" draft-ietf-mipshop-fast-mipv6-03 (work in progress), October 2004. Referred to herein as [I-D.ietf-mipshop-fast-mipv6].
5. Liebsch, M., "Candidate Access Router Discovery", draft-ietf-seamoby-card-protocol-08 (work in progress), September 2004. Referred to herein as [I-D.ietf-seamoby-card-protocol].
6. Loughney, J., "Context Transfer Protocol", draft-ietf-seamoby-ctp-11 (work in progress) August 2004. Referred to herein as [I-D.ietf-seamoby-ctp].
7. Aboba, B., "Extensible Authentication Protocol (EAP) Key Management Framework", draft-ietf-eap-eying-04 (work in progress), November 2004. Referred to herein as [I-D.ietf-eap-keying].
8. Forsberg, D., Ohba Y., Patil, B., Tschofenig, H. and A. Yegin, "Protocol for Carrying Authentication for Network Access (PANA)", draft-ietf-pana-pana-07 (work in progress), December 2004. Referred to herein as [I-D.ietf-pana-pana].
9, Kim, P., Volz, B. and S. Park, "Rapid Commit Option for DHCPv4", draft-ietf-dhc-rapid-commit-opt-05 (work in progress), June 2004. Referred to herein as [I-D.ietf-dhc-rapid-commit-opt].
10. ITU-T, "General Characteristics of International Telephone Connections and International Telephone Circuits: One-Way Transmission Time." Referred to herein as [RG98].
11. ITU-T, "The E-Model, a computational model for use in transmission planning." Referred to herein as [ITU98].

12. ETSI, "Telecommunications and Internet Protocol Harmonization Over Networks (TIPHON) Release 3: End-to-end Quality of Service in TIPHON systems; Part 1 General Aspects of Quality of Service." Referred to herein as [ETSI].
13. Kivinen, T. and H. Tschofenig "Design of the MOBIKE protocol," draft-ietf-mobike-design-01 (work in progress), January 2005. Referred to herein as [I-D.ietf-mobike-design].
14. Moskowitz, R., "Host Identity Protocol", draft-ietf-hip-base-01 (work in progress), October 2004. Referred to herein as [I-D.ietf-hip-base].
15. Almes, G., Kalidindi, S. and M. Zekauskas, "A One-way Delay Metric for IPPM", RFC 2679, September 1999. Referred to herein as [RFC2679].
16. Almes, G., Kalidindi. S. and M. Zekauskas, "A One-way Packet Loss Metric for IPPM", RFC 2680, September 1999. Referred to herein as [RFC2680],
17. Almes. G., Kalidindi, S. and M. Zekauskas, "A Round-trip Delay Metric for IPPM", RFC 2681, September 1999. Referred to herein as [RFC2681].
18. Simpson, W., "IP in IP Tunneling", RFC 1853, October 1995. Referred to herein as [RFC1853].
19. Patrick, M., "DHCP Relay Agent Information Option", RFC 3046, January 2001. Referred to herein as [RFC3046].
20. Schulzrine, H., "Application Layer Mobility Using SIP." Referred to herein as [SIPMM].
21. Yegin, A., "Supporting Optimized Handover for iP Mobility-Requirements for Underlying Systems", draft-manyfolks-I2-mobilereq-02 (work in progress), July 2002. Referred to herein as [I-D.manyfolks-I2-mobilereq].
22. Cambell, A., Gomez, J., Kim, S. Valko A. and C. Wan, "Design, Implementation, and Evaluation of Cellular IP." Referred to herein as [CELLIP].
23. Ramjee, R. Porta, T. Thuel, S. Varadhan, K. and S. Wang, "HAWAII: A Domain-based Approach for Supporting Mobility in Wide-area Wireless networks." Referred to herein as [HAWAII].
24. Das, S., Dutta, A., Misra, A. and S. Das, "IDMP: An Intra-Domain Mobility Management Protocol for Next Generation Wireless Networks.": Referred to herein as [IDMP].
25. Calhoun, P., Montenegro, G., Perkins., C. and E. Gustafsson, "Mobile IPv4 Regional Registraton", draft-ietf-mobileip-regA-tunnel-09 (work in progress), July 2004. Referred to herein as [I-D.ietf-mobileip-reg-tunnel].
26. Yokota, H., Idoue, A. and T. Hasegawa "Link Layer Assisted Mobile IP Fast Handoff Method over Wireless LAN Networks." Referred to herein as [YOKOTA].
27. Shin, S., "Reducing MAC Layer Handoff Latency in IEEE 802.11 Wireless LANs." Referred to herein as [MACD].
28. Dutta, A., "Secured Universal Mobility." Referred to herein as [SUM],
29. Dutta, A., "Fast handoff Schemes for Application Layer Mobility Management." Referred to herein as [SIP-FAST].
30. Gwon, Y., Eu, G. and R. Jain, "Fast Handoffs in Wireless LAN Networks using Mobile initiated Tunneling Handoff Protocol for IPv4 (MITHv4)". January 2005. Referred to herein as [MITH].
31. Anjum, F., Das, S., Dutta, A., Fajardo, V., Madhani, S., Ohba, Y., Taniuchi, K., Yaqub, R. and T. Zhang, "A proposal for MIH function and Information Service", January 2005. Referred to herein as [NETDISC].
32. Dutta, A., "GPS-IP based fast-handoff for Mobiles." Referred to herein as [GPSIP].
33. [MAGUIRE] Vatn, "The effect of using co-located care-of-address on macro handover latency."

3. Handoffs of Mobile Devices

In the context of, for example, a mobile device with an IP-based wireless network interface (such as, e.g., an IEEE 802.11 or an 802.16 interface), the mobile device needs to perform roaming or handoffs when it moves from one network into another network. With existing handoff methodologies, handoff is typically accomplished by performing the following sequence of protocol layer specific handoffs:

First, handoff takes place at the physical layer. In this regard, the mobile device switches its radio channel to, e.g., a wireless base station or wireless access point in the target network.

Second, handoff takes place at layer-2. In this regard, the mobile device switches its layer-2 (i.e., lnk-layer) connections to the target network. As explained above, the link layer or layer-2 refers to the protocol immediately below the IP-layer that carries user traffic. The mobile device performs layer-2 authentication with the target network if the target network requires such authentication.

Third, handoff takes place at the IP-layer. In this regard, the mobile device obtains a local IP address from the target network, performs IP-layer authentication if required by the target network, and then performs IP-layer location update so that IP packets destined to the mobile device can be routed by the IP network to the mobile device via the target network. In some instances, one way to support IP layer location update is to use Mobile IP defined by the Internet Engineering Task Force (IETF).

Fourth, handoff takes place at the application-layer. The mobile device performs necessary steps at the application layer to ensure that its application traffic will flow correctly to the applications on the mobile device via the target network. For example, when the mobile device uses the Session Initiation Protocol (SIP) defined by the IETF to manage its application-layer signaling, an application layer handoff can be achieved by the mobile device updating its current location with its home SIP server. The mobile device may also need to carry out application-layer authentication with the target network if required by the target network. This is the case for example, when the mobile device is using the IP Multimedia Subsystem (IMS) in a visited 3GPP ($3^{rd}$ Generation Partnership Project) wireless network, where the IMS is a SIP-based system supporting application-layer signaling and management for multimedia applications over 3SGPP networks.

Sometimes, either IP-layer handoff or application-layer handoff is sufficient. That is, it may be unnecessary to perform both IP-layer and application-layer handoff These existing methods can lead to significant handoff delays when they are used in IP-based wireless networks. For example, in a geographical region where there are many wireless local area networks (WLANs) such as in cities, inside building complexes or residential homes, or in other public places where multiple wireless LANs exist, a mobile device may receive strong radio signals from multiple radio networks at the same time. However the mobile device may not be authorized to use some of these radio networks.

Under the existing handoff methods described above, a mobile device will select a target network based on, for example, radio signal strengths, and will go through the steps described above to connect to the target network and then discover, for example, if it is authorized to use the network or if the network does not provide the capabilities (e.g., sufficient available bandwidth) or the services that the mobile device needs. Consequently, the mobile device will have to try to connect to another network, and will repeat this process until it finally connects to a network that provides, and that allows it to use, the capabilities and services it needs (or until it has exhausted all possible networks). Accordingly, with existing systems, a handoff can take a Song time that can be intolerable and can delay sensitive applications such as, as some examples, live voice, and/or video applications.

While a variety of systems and methods are known, there remains a need for improved systems and methods for performing handoffs in wireless networks.

SUMMARY OF THE INVENTION

A broad aspect of the preferred embodiments of the present invention is a method of obtaining an IP address, even before MN requires the IP address.

Another aspect of the preferred embodiments of the present invention is the enablement of maintaining of a pool of IP addresses that will be delivered to the MN, just in the moment of need.

Another aspect of the preferred embodiments of the present invention is the reduction of the time required to provide an IP address to MN, in cases where DHCP is used to pre-configure an IP address in MPA framework.

Another aspect of the preferred embodiments of the present invention is the is application of the system of maintaining of a pool of IP addresses that will be delivered to the MN, just in the moment of need to PANA-assisted proactive IP address acquisition, IKEv2-assisted proactive IP address acquisition, and Proactive IP address acquisition using DHCP only.

Another aspect of the preferred embodiments of the present invention is a system in which PAA creates beforehand a set of PANA Session-Id, even when no PANA sessions have been created with a particular PaC. The set of PANA Session-Id forms a pool of Session-Ids that is consumed when PAA sends the first PANA message that requires a Session-Id to a new PaC, that is, when PAA sends a PANA-Start-Request, a Session-Id is transmitted from the pool.

Another aspect of the preferred embodiments of the present invention is a system in which, during the creation of Session-Id pool, PAA will also reserve some resources by using that Session-Id as an index to the reserved resources.

Another aspect of the preferred embodiments of the present invention is the use of the index to pre-fetch an IP address through DHCP based on a set of pre-generated PANA Session-Id, thereby providing an IP address to MN (PaC) faster and reducing considerably the overall pre-authentication time.

Another aspect of the preferred embodiments of the present invention is a system in which a PAA creates and stores a series of unique Session-Id's before they are needed by a client. When the PaC sends a Session-Id request in the form of a management frame, the PAA returns a Session-Id from its already-created pool of Session-Id's. The PAA then removes the Session-Id from the unused pool and moves it to a new table where it is associated with the PaC to which it was sent. The PaC stores the received Session-Id along with information about the PAA that sent the Session-Id so that if multiple Session-Id's are received, the PaC knows with which PAA it belongs.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which.

DESCRIPTION OF THE PREFERRED EMBODIMENTS

Figure 1:
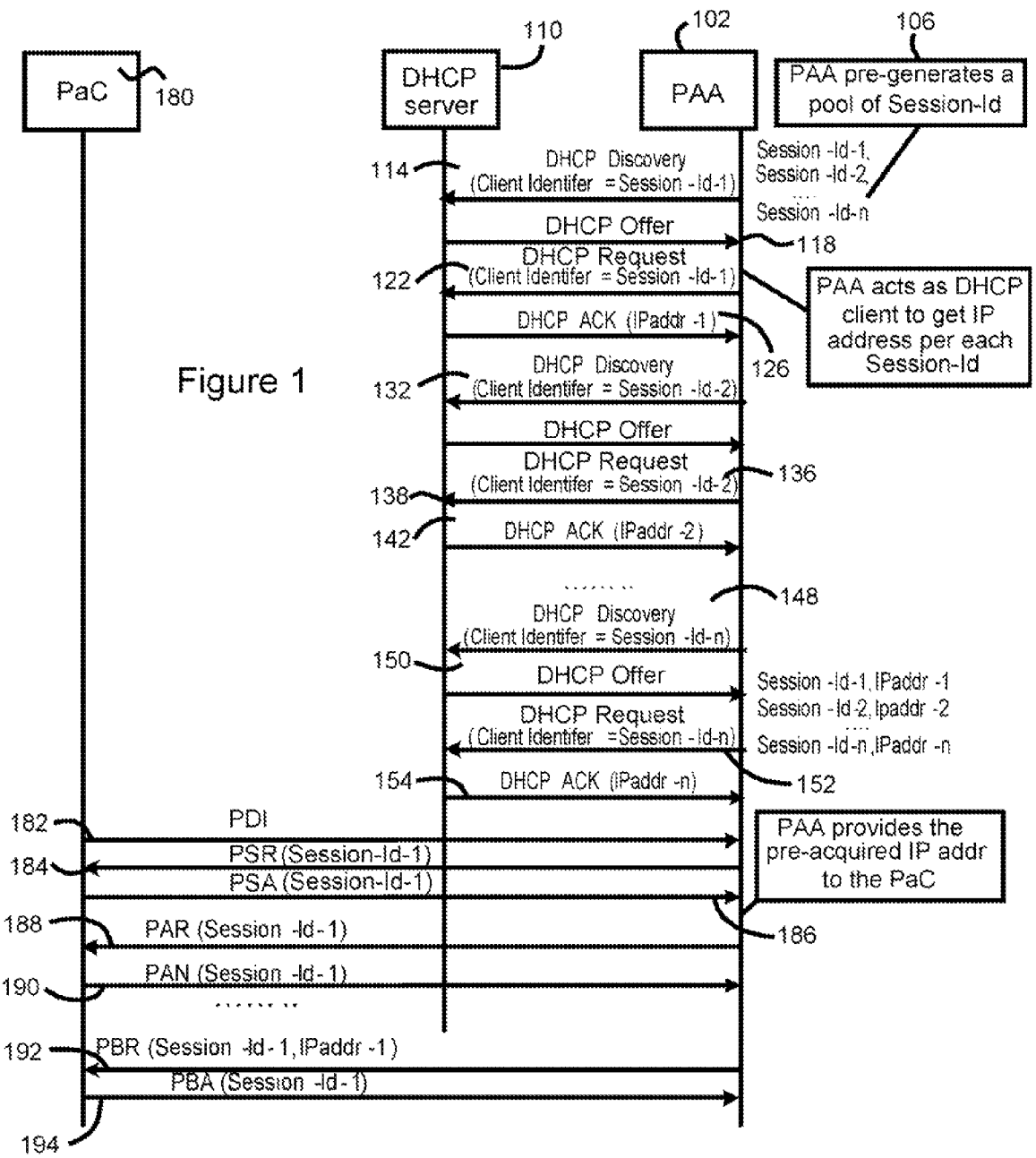
FIG. 1 is a diagrammatic representation of PANA-assisted proactive IP address acquisition.

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

Introduction to the Preferred Embodiments

The following abbreviations are employed herein.

Authentication Agent (M);
Buffering Control Protocol (BCP);
Buffering Node (BN); Buffer Size (bsz),
Classified Traffic (tc);
Configuration agent (CA);
Correspondent Node (CN);
Dynamic Host Configuration Protocol (DHCP);
End of Service (EOS);
Flushing Policy (FP);
Internet Key Exchange second version (IKEv2);
IP security (IPsec);
Mobile node (MN);
Authentication protocol (PANA);
PANA authentication agent (PAA);
PANA client (PaC);
Result Code (rcode); and
Time-limited Timeout (hp).

Terminology

Mobility Binding:

A binding between a locator and an identifier of a mobile terminal. Mobility Management Protocol (MMP). A protocol that operates at network layer or higher to maintain a binding between a locator and an identifier of a mobile terminal.

Mobility Management Protocol (MM P):

A protocol that operates at network layer or higher to maintain a binding between a locator and an identifier of a mobile terminal.

Binding Update:

A procedure to update a mobility binding.

Media-independent Pre-Authentication Mobile Node (MN):

A mobile terminal of media-independent pre-authentication (MPA) which is a mobile-assisted, secure handover optimization scheme that works over any link-layer and with any mobility management protocol. An MPA mobile node is an IP node. In this document, the term "mobile node" or "MN" without a modifier refers to "MPA mobile node." An MPA mobile node usually has a functionality of a mobile node of a mobility management protocol as well.

Candidate Target Network (CTN):

A network to which the mobile may move in the near future.

Target Network (TN):

The network to which the mobile has decided to move. The target network is selected from one or more candidate target network.

Proactive Handover Tunnel (PHT):

A bidirectional IP tunnel that is established between the MPA mobile node and an access router of the candidate target network. In this document, the term "tunnel" without a modifier refers to "proactive handover tunnel."

Point of Attachment (PoA):

A link-layer device (e.g., a switch, an access point or a base station, etc.) that functions as a link-layer attachment point for the MPA mobile node to a network.

Care-of Address (CoA):

An IP address used by a mobility management protocol as a locator of the MPA mobile node.

Media-independent Pre-Authentication (MPA) is a mobile-assisted, secure handover optimization scheme that works over any link-layer and with any mobility management protocol. With MPA, a mobile node is not only able to securely obtain an IP address and other configuration parameters for a CTN, but is also able to send and receive IP packets using the obtained IP address before it actually attaches to the CTN. This makes it possible for the mobile node to complete the binding update of any mobility management protocol and use the new CoA before performing a handover at link-layer.

MPA works over any link-layer and with any mobility management protocol including Mobile IPv4, Mobile IPv6, MOBIKE, HIP, SIP mobility, etc. In MPA, the notion of IEEE 802.11i pre-authentication is extended to work at a higher layer, incorporating additional mechanisms to perform early acquisition of IP address from a network from which the mobile terminal may move, as well as pro-active handover to the network while the mobile terminal is still attached to the current network.

A MN supporting MPA, starts a preauthentication process with an M. A successful authentication enables the PAA to establish security associations with the AA. This is in addition to a CA used for securely executing a configuration protocol to securely deliver an IP address and other configuration parameters to the mobile nodes, and an AR securely executing a tunnel management protocol to establish a proactive handover tunnel to the mobile node. This entire process is carried out when MN is connected to a current point of attachment. It is explained in detail in "draft-ohba-mobopts-mpa-framework-02.txt", March 2006, and "drat-ohba-mobopts-mpa-framework-3.txt", Oct. 22, 2006, the disclosures of which are incorporated herein by reference:

As the aforenoted document mentions, IP address configuration could take between some milliseconds to several seconds. In fact, duplicate address detection could take from 4 to 15 seconds. To avoid configuration time affecting handover time, the MPA of the present invention commences confirmation before handover, upon attachment of the MN to the current network.

Configuration time affects the overall pre-authentication time and, although pre-authentication time does not affect handover time, it may affect when the MN starts pre-authentication. If the pre-authentication time is longer than, for example, several seconds, the MN must start pre-authentication substantially prior to starting the handover. However, if pre-authentication time is reduced, the MN can start pre-authentication at the time when it is actually required rather than in advance. Additionally, MN speed can be increased due to a reduced pre-authentication time.

Background

1. Architecture

In preferred embodiments, there are three methods of proactively obtaining IP addresses, through the use of PANA-assisted pro-active IP address acquisition, IKEv2-assisted proactive IP address acquisition, pro-active IP address acquisition using DHCP only.

In the MPA framework, the following functional elements are expected to reside in each CTN to communicate with a mobile node. Authentication Agent (AA), Configuration Agent (CA) and Access Router (AR). Some or all of those elements can be placed in a single network device or in separate network devices.

1.1. PANA Assisted Proactive IP Address Acquisition

The diagrammatic flow chart 100 of FIG, 1 illustrates the process of a PANA assisted acquisition of IP addresses. In this case, the PAA 102 generates a pool of Session-Id values 106, with the number of Session-Id values in the pool ranging from 1 to n. The IP addresses are processed individually following the same sequence for each pre-generated Session-Id.

To create the pool of Session-Ids, the PPA 102 looks for and identifies a DHCP server 110, sending a "discovery" message containing a Client Identifier and Session-Id request 114 to determine the availability and acceptability of the DHCP server 110. The DHCP server 110 responds with an "offer" 118 providing the PPA 102 with the requested information. If the DHCP server 110 responds positively the PPA 102 proceeds. The PPA 102 acts as either a DHCP relay or a DHCP client and sends a DHCP request for Session-Id-1 122 to the DHCP server 110 for an IP address. This is accomplished by using a DHCP Client Identifier Option (option number 61) which contains the pre-generated PANA Session-Id. DHCP server 110 will respond with an acknowledgement and an IP address 126 assigned to the pre-generated Session-Id. The PAA 102 will then cache the received IP address and repeat the process.

When the PAA 102 sends a request for Session-Id-2 the same procedure is followed where the PPA 102 locates the DHCP server 110 requesting capability and availability 132. The DHCP server 110 responds with an "offer" 136 at which point the PPA 102 sends a request for an IP address for Session-Id-2. The DHCP server 110 acknowledges the request with an IP address 142 assigned to the pre-generated Session-Id. The PAA 102 then caches the IP address and proceeds to the next request.

This process is repeated, as seen in the process at discovery 150, offer 152, request 152 and acknowledgement 154 for each Session-Id generated by the PAA 102.

The PAA 102 upon commencement of the foregoing process has a number of stored IP addresses that are maintained in the cache. In that way, when PaC 180 requires an IP address from the PAA 102, it starts pre-authentication by sending a discovery request.

The PAA 102 sends the next pre-acquired Session-Id from the pool to the PaC 184. Upon acknowledgment of the Session-Id 186, authentication information is exchanged between PaC and PAA 188 and 189 and when authentication succeeds the PAA 102 sends the pre-fetched IP address associated with that Session-Id directly to the PaC 192. The receipt of the IP address is acknowledged 194 and the process is repeated as needed. By caching IP addresses, the PaC is able to obtain addresses without incurring the delays that would be experienced when the DHCP server 110 forwards the addresses at the time of the initial request.

After handover, PaC can use the DHCP Client Identifier Option to carry the PANA Session-Id used for pre-etching the IP address before handover, for reacquiring the pro-actively obtained IP address after handover.

3. IKEv2 Assisted Proactive IP Address Acquisition

Figure 2:
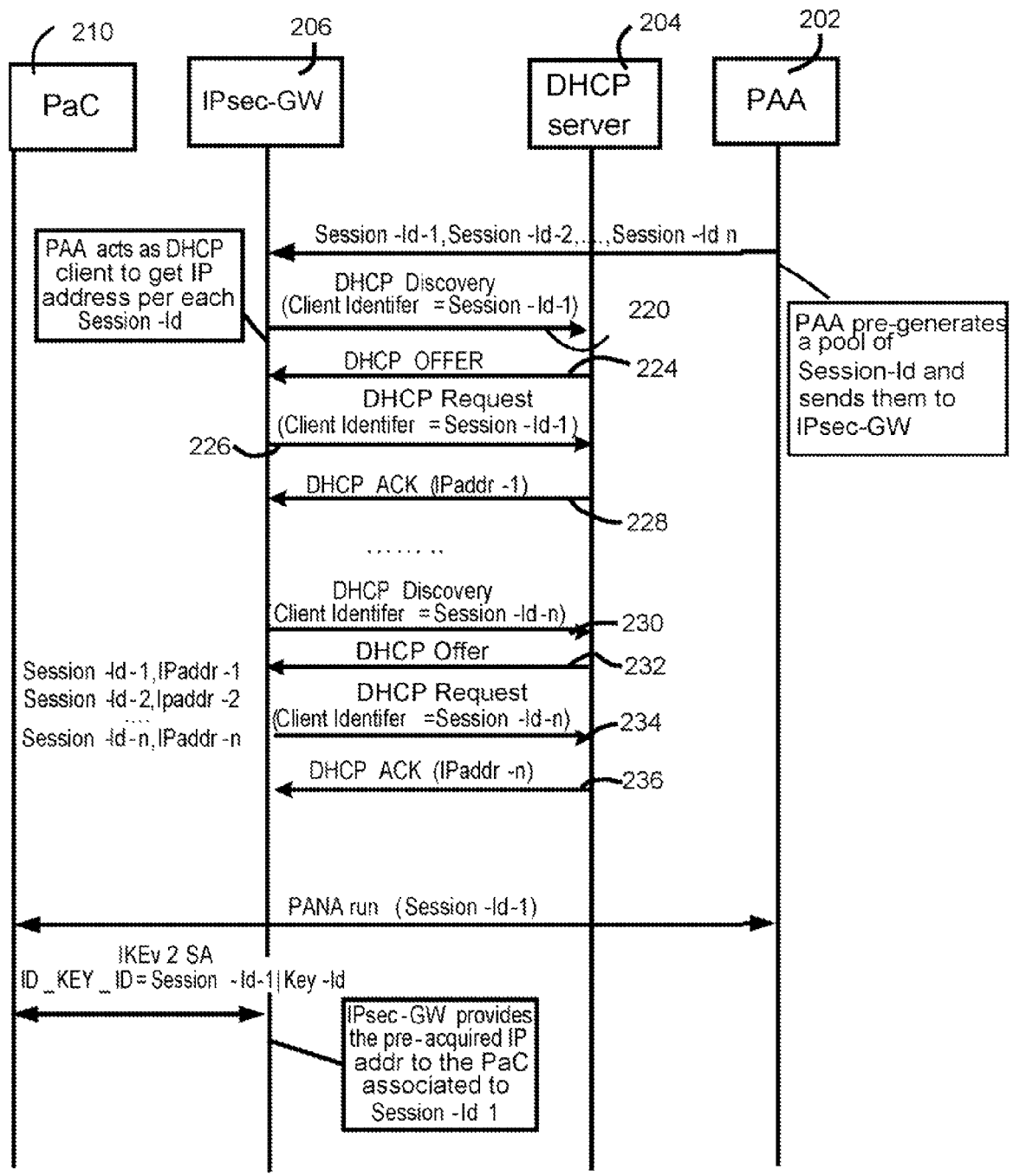
FIG. 2 is a diagrammatic representation of IKEv2-assisted proactive IP address acquisition.

As seen in the diagram 200 of FIG. 2, a IKEv2-assisted pro-active IP address acquisition can also be used to pre-fetch IP addresses. In this embodiment, the IP address from the CTN is obtained as part of standard IKEv2 procedure, using a co-located DHCP relay agent, placed on the access router or a DHCP client for obtaining the IP address from the DHCP server 204 in the target network using standard DHCP.

The PAA 202 pre-generates a pool of Session-Ids, and forwards that pool of Session-Ids directly to the IPsec-GW 206. The DHCP relay/client in the IPsec-GW 206 is then configured with the set of pre-generated Session-Ids received from, and initially created by, the PAA 202. The DHCP relay/client in the IPsec-GW 206 uses the n PANA Session-Ids to request one IP address per each configured Session-Id to build a pool of IP addresses.

This is accomplished by the IPsec-GW 206 proceeding to contact the DHCP server 204 in discovery mode 220 to obtain communication acceptability data. The DHCP server 204 then returns an offer 224 providing capability and availability for communication. If the offer 224 is positive, the IPsec-GW 206 sends a request 228 for an IP address to be associated with Session-Id-1. The DHCP 204 acknowledges the request and returns with an IP address 228, IPaddr-1, associated with the Session-Id-1.

This process is continued, as indicated by the transmissions subsequent discover transmission 230, offer transmission 232, request transmission 234, and acknowledgement transmission 236, and is repeated until all IP addresses are obtained.

When the PaC 210 makes contact with the AR and engages an IKEv2 security association, the PaC must specify the Session-Id provided by the PAA during the PANA authentication step. The Session-Ids that are originally pooled by the PANA are sent to the PaC 210 during this authentication process.

To obtain an IP address, the PaC 210 sends a PANA pre-generated Session-Id to the IPsec-GW, which can be provided inside ID_KEY_ID payload. IPsec-GW will returns the IP address corresponding to the Session-Id from the pool pre-fetched from the DHCP server, eliminating delays.

The IPsec-GW 206 provides the IP address associated with each Session-Id request through a INTERNAL_IP4_ADDRESS or INTERNAL_IP6_attribute within a Configuration Payload. IPsec-GW 206 will keep active the IP address leasing by acting as DHCP client. For that, IPsec-GW 206 will include a DHCP Client Identifier Option with the PANA Session-Id within the DHCP request sent to the DHCP server.

4. Pro-Active IP Address Acquisition using Only DHCP

In case of proactive IP address by using only DHCP, direct DHCP communication between the mobile node (MN) and the DHCP relay or DHCP server in the CTN is enabled. Specifically, the mobile node sends a unicast DHCP message to the DHCP relay agent or to the DHCP server in the CTN requesting an address, while using the address associated with the current physical interface as the source address of the request. In this case, after pre-generating a set of PANA Sessions-Ids, PAA has two possible alternatives.

I. PAA installs the set of pre-generated Session-Ids into DHCP server through some protocol or API. For each PANA Session-Id installed into the DHCP server there is an associated IP address.

II. PAA follows the same mechanism carried out with in the case of PANA-assisted proactive IP address acquisition, as described above. That is, the PAA acting as either a DHCP relay or a DHCP client, requests an IP address to DHCP server by using a DHCP Client Identifier Option which contains the pre-generated PANA Session-Id. That is, It creates the association between Session-Id$_i$ and IPaddr$_i$ in the DHCP server. Nevertheless, in this case, PAA does not store IP address returned by DHCP server.

In both cases, MN will send the unicast DHCP message to a DHCP relay or directly to DHCP server including a DHCP Client Identifier Option with the PANA Session-Id sent by PAA during PANA authentication.

As explained in the case of PANA-assisted proactive IP address acquisition, as described above, after handover, PaC will use the DHCP Client Identifier Option to carry the PANA Session-Id used for pre-fetching the IP address before handover, for reacquiring the pro-actively obtained IP address after handover.

Broad Scope of the Invention:

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this applications means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A method reducing the time required to provide an Internet Protocol (IP) address to a mobile node (MN) using a Dynamic Host Configuration Protocol (DHCP) to pre-configure an IP address in a Media-independent Pre-Authentication (MPA) framework, comprising the steps of:

a) a Protocol for carrying Authentication for Network Access (PANA) authentication agent (PAA) generating a plurality of Session-Ids, b) maintaining said plurality of Session-Ids as a pool of Session-Ids, c) retrieving a Session-Id from said pool when said PAA sends the first PANA message that requires a Session-Id, wherein providing a pre-generated IP address to an MN reduces pre-authentication time, and wherein said PAA acts as either a DHCP relay or DHCP client when sending a DHCP request to a DHCP server using a DHCP Client Identifier Option that contains a pre-generated PANA Session-Id, and said PAA receives from the DHCP server an IP address based on said identifier.

2. The method of claim 1, wherein said PAA caches the IP address associated with said pre-generated Session-Id.

3. The method of claim 2, wherein a PaC uses said DHCP Client Identifier Option to carry said PANA Session-Id used for pre-fetching said IP address before handover, for reacquiring said pro-actively obtained IP address after handover.

4. The method of claim 1, where said PAA provides a pre-acquired IP address to a PaC.

5. The method of claim 1, further comprising the steps of said PAA creating a set of PANA Session-Ids, prior to PANA sessions having been created with a particular PaC.

6. The method of claim 5, further comprising the step of a new PaC trying to establish a new PANA Session-Id with said PAA, said PAA sends a PANA-Auth-Request, and a Session-Id is transmitted from said set of PANA Session-Ids.

7. The method of claim 1, wherein when a PaC requires an IP address from a PAA, pre-authentication is started by sending a PANA-Client-Initiation message that is responded with a PANA-Start-Request message by the PAA with a Session-Id, the IP address is carried in a PANA-Bind-Request message and the receipt of the IP address is acknowledged with a PANA-Bind-Answer message and the process is repeated as needed, whereby PaC is able to obtain addresses without incurring the delays that would otherwise be experienced when the DHCP server forwards the addresses at the time of the initial request.

8. The method of claim 7, wherein after handover, PaC uses the DHCP Client Identifier Option to carry the PANA Session-Id used for pre-fetching the IP address before handover, for reacquiring the pro-actively obtained IP address after handover.

9. A method reducing the time required to provide an Internet Protocol (IP) address to a mobile node (MN) using a Dynamic Host Configuration Protocol (DHCP) to pre-configure an IP address in a Media-independent Pre-Authentication (MPA) framework, comprising the steps of:

a) a Protocol for carrying Authentication for Network Access (PANA) authentication agent (PAA) generating a plurality of Session-Ids, b) maintaining said plurality of Session-Ids as a pool of Session-Ids, c) retrieving a Session-Id from said pool when said PAA sends the first PANA message that requires a Session-Id, wherein providing a pre-generated IP address to an MN reduces pre-authentication time, and wherein IP addresses are processed individually following the same sequence for each pre-generated Session-Id, and a set of Session-Id is generated by PAA looking for and identifying a DHCP server, sending a DHCP discovery message containing a Client Identifier and Session-Id request to determine the availability and acceptability of the DHCP server.

10. The method of claim 9, wherein said DHCP server responds with an offer providing the PAA with the requested information, and when said DHCP server responds positively, said PAA proceeds and acts as either a DHCP relay or a DHCP client and sends a DHCP request for Session-Id-1 to the DHCP server for an IP address.

11. The method of claim 10, further comprising using a DHCP Client Identifier Option which contains a pre-generated PANA Session-Id, said DHCP server responding with an acknowledgement, an IP address is assigned to said pre-generated Session-Id, and said PAA caches the received IP address and the process is repeated to obtain an additional Session-Id.

12. A method of reducing the time required to provide an Internet Protocol (IP) address to a mobile node (MN) using an Internet Key Exchange version 2 (IKEv2) assisted pro-active IP address acquisition to pre-fetch IP addresses, comprising the steps of:

a) obtaining an IP address from a Candidate Target Network (CTN) as part of a standard IKEv2 procedure, b) using a co-located Dynamic Host Configuration Protocol (DHCP) relay agent or DHCP client, placed on an Internet Protocol Security (IPsec) gateway for obtaining the IP address from a DHCP server in a target network using standard DHCP;

c) a Protocol for carrying Authentication for Network Access (PANA) authentication agent (PAA) pre-generates a pool of Session-Ids, d) forwarding said pool of Session-Ids directly to the IPsec gateway; and further comprising configuring a DHCP relay/client in the IPsec gateway with said pool of pre-generated Session-Ids received from, and initially created by, said PAA, and wherein said DHCP relay/client in the IPsec gateway uses said pool of PANA Session-Ids to request one IP address per each configured Session-Id to build a pool of IP addresses.

13. The method of claim 12, further comprising the steps of said IPsec gateway contacting said DHCP server in discovery mode to obtain communication acceptability data, said DHCP server then returning an offer providing capability and availability for communication, when said offer is positive, said IPsec gateway sends a request for an IP address to be associated with a first Session-Id, said DHCP acknowledges said request and returns an IP address, associated with said first Session-Id, and repeating said steps until all IP addresses are obtained.

14. The method of claim 13, further comprising the step of said PaC making contact with the IPsec gateway and engaging an IKEv2 security association, and said PaC specifies the Session-Id provided by the PAA during the PANA authentication step.

15. A method of reducing the time required to provide an Internet Protocol (IP) address to a mobile node (MN) using an Internet Key Exchange version 2 (IKEv 2) assisted pro-active IP address acquisition to pre-fetch IP addresses, comprising the steps of:

a) obtaining an IP address from a Candidate Target Network (CTN) as part of a standard IKEv2 procedure, b) providing a co-located Dynamic Host Configuration Protocol (DHCP) relay agent or DHCP client, placed on an Internet Protocol Security (IPsec) gateway for obtaining the IP address from a DHCP server in a target network using standard DHCP, c) a Protocol for carrying Authentication for Network Access (PANA) authentication agent (PAA) pre-generates a pool of Session-Ids, d) forwarding said pool of Session-Ids directly to the IPsec gateway; and further comprising the step of a PANA client (PaC) sending a PANA pre-generated Session-Id to the IPsec gateway to obtain an IP address, said IP address being provided inside an ID_KEY_ID payload, and the IPsec gateway returning the IP address corresponding to the Session-Id from the pool pre-fetched from the DHCP server, whereby delays are eliminated.

16. A method of reducing the time required to provide an Internet Protocol (IP) address to a mobile node (MN) using only Dynamic Host Configuration Protocol (DHCP), comprising:
   a) enabling direct DHCP communication between the mobile node and a DHCP relay or DHCP server in a Candidate Target Network (CTN);
   b) said mobile node sending a unicast DHCP message to the DHCP relay agent or to the DHCP server in the CTN, requesting an address, while using the address associated with the current physical interface as the source address of the request; and
   wherein a set of Protocol for carrying Authentication for Network Access (PANA) Sessions-Ids have been pre-generated, and a PANA authentication agent (PAA) installing said set of pre- generated Session-Ids into a DHCP server through some protocol or API and wherein for each PANA Session-Id installed into the DHCP server there is an associated IP address.

17. The method of claim 16, further comprising said PAA acting as either a DHCP relay or a DHCP client, requesting an IP address to the DHCP server by using a DHCP Client Identifier Option which contains the pre-generated PANA Session-Id, thereby creating an association between Session-Id$_i$; and Ipaddr$_i$ in the DHCP server and wherein the PAA does not store the IP address returned by the DHCP server.

18. A method of reducing the time required to provide an Internet Protocol (IP) address to a mobile node (MN) using only Dynamic Host Configuration Protocol (DHCP), comprising:
   a) enabling direct DHCP communication between the mobile node and a DHCP relay or DHCP server in a Candidate Target Network (CTN);
   b) said mobile node sending a unicast DHCP message to the DHCP relay agent or to the DHCP server in the CTN, requesting an address, while using the address associated with the current physical interface as the source address of the request and wherein a set of Protocol for carrying Authentication for Network Access (PANA) Session-Ids have been pre-generated;
   wherein said mobile node sends a unicast DHCP message to a DHCP relay or directly to a DHCP server including a DHCP Client Identifier Option with the PANA Session-Id sent by a PANA authentication agent (PAA) during PANA authentication and after handover, the PANA authentication client (PaC) uses said DHCP Client Identifier Option to carry the PANA Session-Id used for pre- fetching the IP address before handover, for reacquiring the pro-actively obtained IP address after handover.

19. A method reducing the time required to provide an Internet Protocol (IP) address to a mobile node (MN) using a Dynamic Host Configuration Protocol (DHCP) to pre-configure an IP address in a Media-independent Pre-Authentication (MPA) framework, comprising the steps of:
   a) a Protocol for carrying Authentication for Network Access (PANA) authentication agent (PAA) generating a plurality of Session-Ids,
   b) maintaining said plurality of Session-Ids as a pool of Session-Ids,
   c) retrieving a Session-Id from said pool when said PAA sends the first PANA message that requires a Session-Id, wherein providing a pre-generated IP address to an MN reduces pre authentication time; and
   wherein said PANA authentication agent (PAA) or other node that obtains a plurality of IP addresses transmits a DHCP discovery request, receives a DHCP offer, transmits a DHCP request, and receives a DHCP acknowledgement in obtaining an IP address corresponding to each session id in said pool of session ids.

20. A method reducing the time required to provide an Internet Protocol (IP) address to a mobile node (MN) using a Dynamic Host Configuration Protocol (DHCP) to pre-configure an IP address in a Media-independent Pre-Authentication (MPA) framework, comprising the steps of:
   a) a Protocol for carrying Authentication for Network Access (PANA) authentication agent (PAA) generating a plurality of Session-Ids,
   b) maintaining said plurality of Session-Ids as a pool of Session-Ids,
   c) retrieving a Session-Id from said pool when said PAA sends the first PANA message that requires a Session-Id, wherein providing a pre-generated IP address to an MN reduces pre-authentication time; and
   further including that the authentication agent receives a discovery request starting pre-authentication from the mobile node when the mobile node requires an IP address from the authentication agent and the authentication agent sends a next session id in said pool of session ids, and when authentication succeeds based on said mobile nodes use of said session id, the authentication agent sends a corresponding IP address from a pool of IP addresses.

* * * * *